(12) United States Patent
Hirano et al.

(10) Patent No.: US 7,869,060 B2
(45) Date of Patent: Jan. 11, 2011

(54) JIG FOR MEASURING AN OBJECT SHAPE AND METHOD FOR MEASURING A THREE-DIMENSIONAL SHAPE

(75) Inventors: Kotaro Hirano, Kure (JP); Hirofumi Kakiuchi, Kure (JP); Yoshiyuki Omori, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 81 days.

(21) Appl. No.: 12/457,032

(22) Filed: May 29, 2009

(65) Prior Publication Data
US 2009/0323081 A1    Dec. 31, 2009

(30) Foreign Application Priority Data
Jun. 26, 2008   (JP)   ............................. 2008-167086
Jun. 26, 2008   (JP)   ............................. 2008-167087

(51) Int. Cl.
*G01B 11/24*    (2006.01)
(52) U.S. Cl. .................................................... 356/601
(58) Field of Classification Search ................. 356/601, 356/244; 250/559.19, 559.22
See application file for complete search history.

(56) References Cited

U.S. PATENT DOCUMENTS

| | | | | |
|---|---|---|---|---|
| 6,072,569 A | * | 6/2000 | Bowen | 356/124 |
| 6,486,963 B1 | * | 11/2002 | Holec | 356/601 |
| 7,194,818 B2 | * | 3/2007 | Otsubo | 33/502 |
| 2005/0235506 A1 | * | 10/2005 | Brost et al. | 33/502 |

FOREIGN PATENT DOCUMENTS

JP   A-2006-078398   3/2006

\* cited by examiner

*Primary Examiner*—Roy Punnoose
(74) *Attorney, Agent, or Firm*—Oliff & Berridge, PLC

(57) ABSTRACT

A jig for measuring an object shape includes a plate having a first surface and a second surface opposed to the first plate and two reference balls fixed to the plate, each ball surface being exposed on both the first and second surfaces. A reference plane is fixed to the plate, the reference plane having a first plane and a second plane that are parallel to each other, the first and second planes being exposed on the first and second surfaces of the plate, respectively. An object-holding portion is fixed to the plate, the object-holding portion having a hole passing through the plate, the object-holding portion being able to hold an object in the hole with the front and back surfaces of the object being exposed on the first and second surfaces of the plate, respectively.

6 Claims, 11 Drawing Sheets

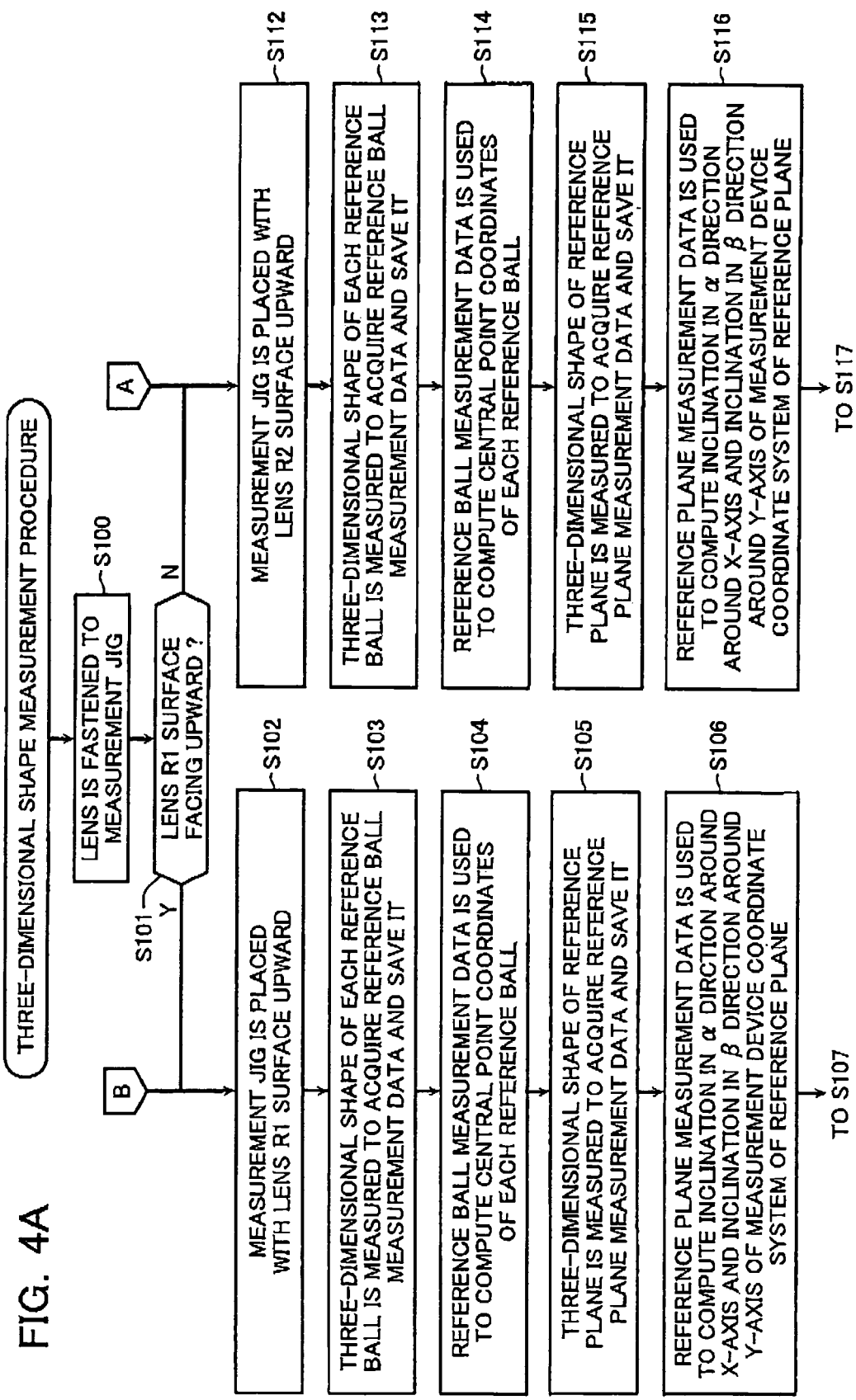

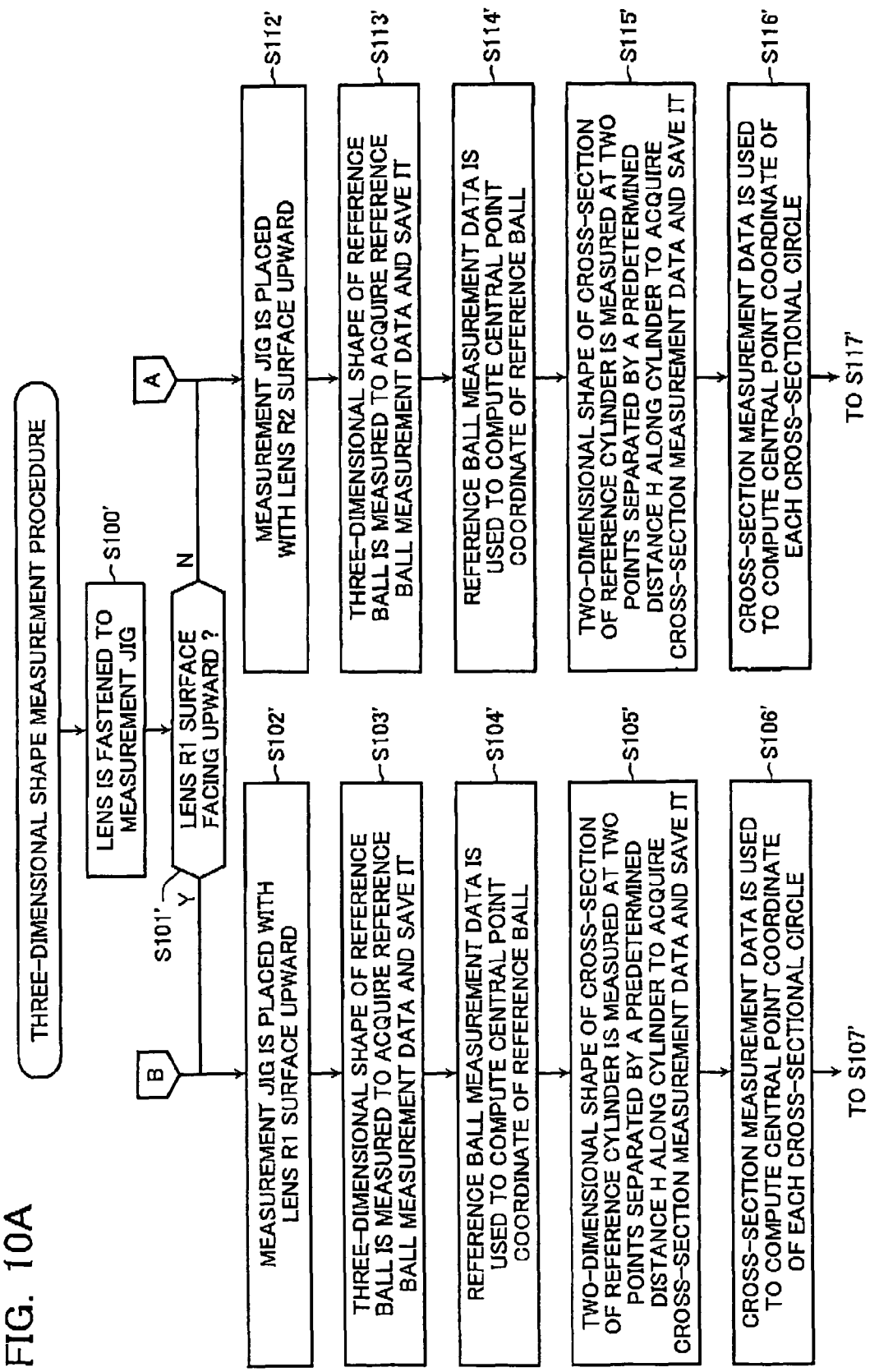

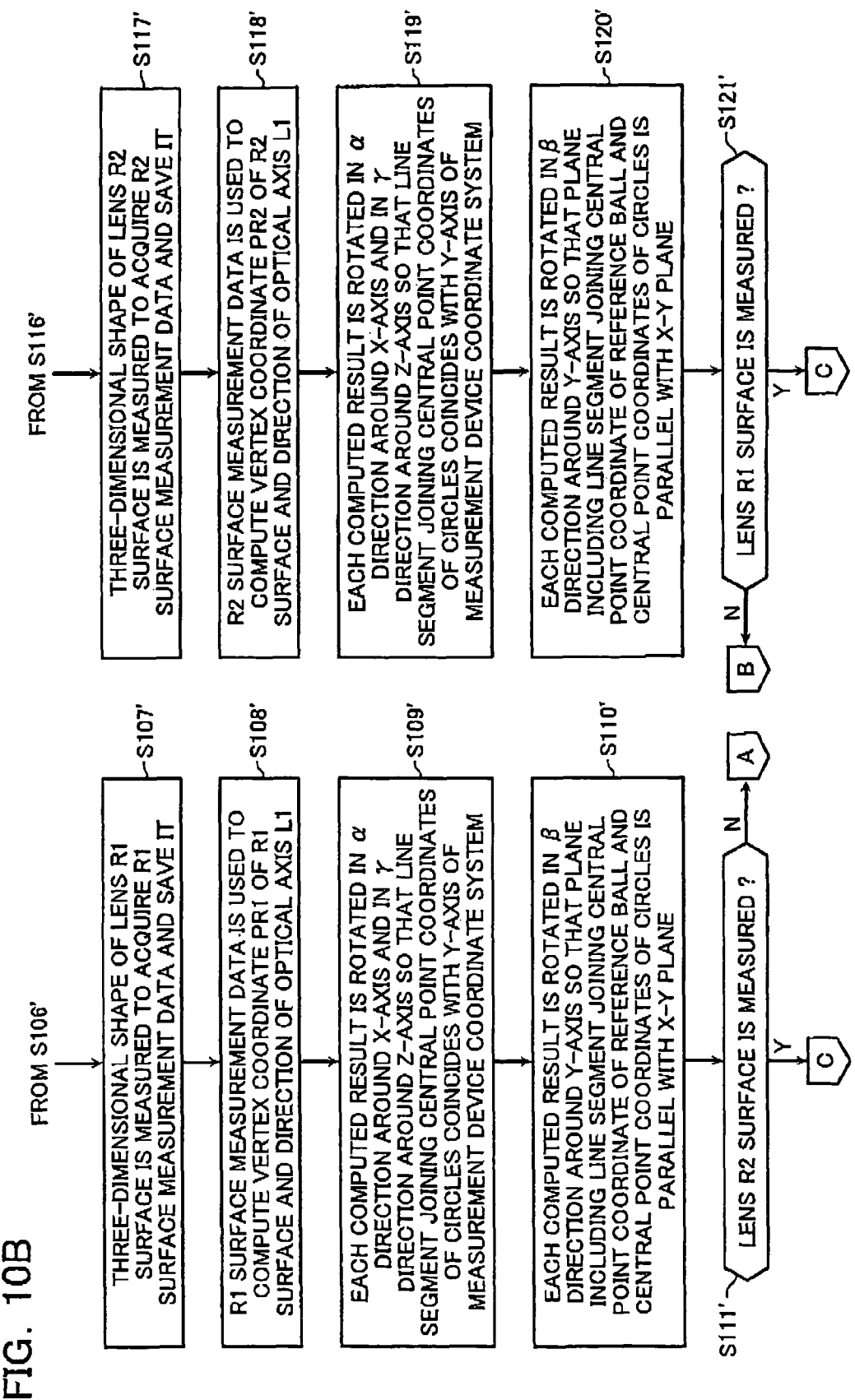

JIG FOR MEASURING AN OBJECT SHAPE AND METHOD FOR MEASURING A THREE-DIMENSIONAL SHAPE

CROSS REFERENCE TO RELATED APPLICATIONS.

This application is based on and claims the benefit of priority from prior Japanese Patent Application No. 2008-167086, filed on, Jun. 26, 2008, and prior Japanese Patent Application No. 2008-167087, filed on, Jun. 26, 2008, the entire contents of which are incorporated herein by reference.

BACKGROUND OF THE INVENTION

1. Field of the Invention

This invention relates to a jig for measuring an object shape such as a lens and a method for measuring a three-dimensional shape for use in a measurement device such as a three-dimensional shape measurement device, which determine, according to the relative position between the front and back surfaces of the object, an eccentricity and an inclination between the front and back surfaces.

2. Description of the Related Art

Well-known conventional methods for determining an eccentricity and an inclination of front and back surfaces of a lens include the following technologies. JP 2006-78398 discloses a measurement method in which an object-holding jig is provided that allows for a measurement of an object from its front and back surface sides, the object-holding jig is used to measure three-dimensional shape data of a lens and the central point coordinates of three reference balls, the three-dimensional shape data of the lens front and back surfaces are combined based on the central point coordinates of the reference balls, and an eccentricity and an inclination between the lens front and back surfaces are computed from the combined data of the lens front and back surfaces.

In the measurement method disclosed in the above document, the three-dimensional shape is measured for the three reference balls to obtain the central point coordinates, the central point coordinates are then used to align the three-dimensional measurement data of the lens front and back surfaces, and the eccentricity and the inclination between the vertexes of the lens front and back surfaces are measured. In this method, unfortunately, it takes a long time for the entire three-dimensional measurement because it takes a long time particularly to measure the three-dimensional shapes of the reference balls.

SUMMARY OF THE INVENTION

A jig for measuring an object shape according to one aspect of the present invention includes a plate having a first surface and a second surface opposed to the first surface; two reference balls fixed to the plate, each ball surface being exposed on both the first and second surfaces; a reference plane fixed to the plate, the reference plane having a first plane and a second plane that are parallel to each other, the first and second planes being exposed on the first and second surfaces of the plate, respectively; and an object-holding portion fixed to the plate, the object-holding portion having a hole passing through the plate, the object-holding portion being able to hold an object in the hole with the front and back surfaces of the object being exposed on the first and second surfaces of the plate, respectively.

A method for measuring the three-dimensional shape of the present invention includes the steps of: providing a jig for measuring an object shape, the jig comprising a plate having a first surface and a second surface opposed to the first plate, two reference balls fixed to the plate, and a reference plane having two parallel planes and fixed to the plate, and holding the reference balls, the reference plane, and at least one object on the plate with their surfaces being exposed on both the first and second surfaces of the plate; performing a three-dimensional measurement for each of the front and back surfaces of the object, the three-dimensional measurement comprising measuring the three-dimensional shape of each of the two reference balls to compute the central point coordinate of each reference ball, measuring the three-dimensional shape of the reference plane to compute inclinations of the reference plane around the x-axis and around the y-axis, measuring the three-dimensional shape of a surface of the object to obtain measurement data, performing coordinate conversion of the central point coordinates, the inclinations, and the measurement data, using the measured three-dimensional shape of the reference plane, to make the reference plane horizontal, and performing coordinate conversion of the central point coordinates, the inclinations, and the measurement data around the z-axis orthogonal to the x- and y-axes so that a line connecting the central point coordinates of the two reference balls is parallel with the y-axis; and using the measurement data obtained for the front and back surfaces of the object to compute relative position data between the front and back surfaces.

A jig for measuring an object shape according to another aspect of the present invention includes a plate having a first surface and a second surface opposed to the first plate; a reference ball fixed to the plate, the ball surface being exposed on both the first and second surfaces; a reference cylinder fixed to a side of the plate with its circumferential surface being exposed on both the first and second surfaces of the plate; and an object-holding portion fixed to the plate, the object-holding portion having a hole passing through the plate, the object-holding portion being able to hold an object in the hole with the front and back surfaces of the object being exposed on the first and second surfaces of the plate, respectively.

A method for measuring a three-dimensional shape according to another aspect of the present invention includes the steps of: providing a jig for measuring an object shape, the jig comprising a plate having a first surface and a second surface opposed to the first plate, a reference ball fixed to the plate, and a reference cylinder fixed to the plate, and holding the reference ball, the reference cylinder, and at least one object on the plate with their surfaces being exposed on both the first and second surfaces of the plate;

performing a three-dimensional measurement for each of a front surface and back surfaces of the object, the three-dimensional measurement comprising measuring the three-dimensional shape of the reference ball to compute the central point coordinate of the reference ball, measuring the two-dimensional shape of each cross section of the reference cylinder at two points separated by a predetermined distance in the axis direction to compute the central point coordinate of each cross-sectional circle, measuring the three-dimensional shape of the surface of the object to obtain measurement data, performing coordinate conversion of the central point coordinates and the measurement data around the x-axis and around the z-axis, using the measurements of the reference ball, the reference cylinder, and the object, so that a line segment connecting each central point coordinate of the circles coincides with the y-axis, and performing coordinate conversion of the central point coordinates and the measurement data around they-axis, using the measurements of the reference ball, the reference cylinder, and the object, so that a plane connecting the central point coordinates of the reference ball and the circles is parallel with the x-y plane; and using the measurement data obtained for the front and back surfaces of the object to compute relative position data between the front and back surfaces.

BRIEF DESCRIPTION OF THE DRAWINGS

FIGS. 4A and 4B are flowcharts of an example procedure for measuring the three-dimensional shape of an object using a jig for measuring an object shape according to the first embodiment of the present invention.

FIGS. 10A and 10B are flowcharts of an example procedure for measuring the three-dimensional shape of an object using a jig for measuring an object shape according to the second embodiment of the present invention.

DETAILED DESCRIPTION OF THE EMBODIMENTS

With reference to the accompanying drawings, a jig for measuring an object shape and a method for measuring a three-dimensional shape according to preferred embodiments of the present invention will be described in more detail below.

First Embodiment

Figure 1:
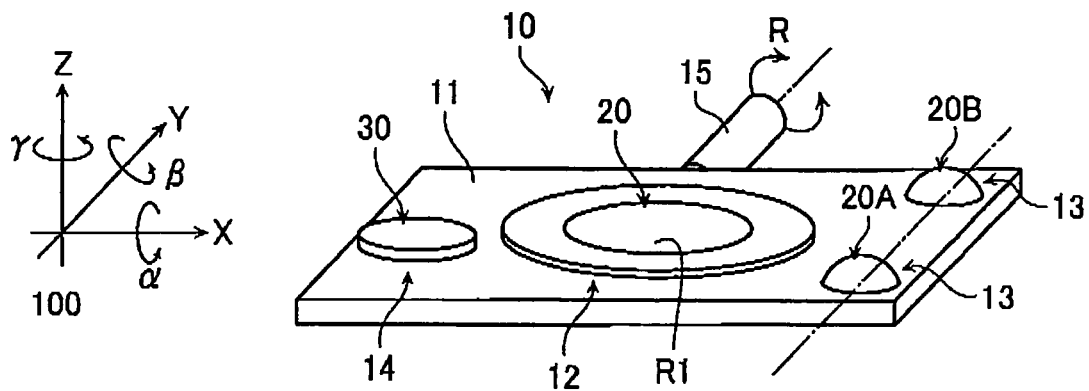
FIG. 1 is a perspective view of the entire configuration of a jig for measuring an object shape according to the first embodiment of the present invention.

FIG. 1 is a perspective view of the entire configuration of a jig for measuring an object shape according to a first embodiment of the present invention. Note that in the description of the first embodiment below, by way of example, the object is a lens manufactured by resin mold, and an eccentricity and an inclination between the lens front and back surfaces are determined by application of a method for measuring a three-dimensional shape according to the present invention.

With reference to FIG. 1, a jig for measuring an object shape ("a measurement jig") 10 includes a rectangular plate 11 with an x-y plane formed on both the front and back surfaces thereof. The plate 11 is made of a material such as steel, stainless steel, aluminum, or brass. The plate 11 holds at least one object such as a lens 20 with the front and back surfaces of the lens 20 exposed on the front and back surfaces of the plate 11, respectively. The measurement jig 10 is adapted to be able to measure the three-dimensional shape or the like and thus an eccentricity and an inclination of the lens 20 on both the front and back surface sides of the lens 20.

The measurement jig 10 also includes two spherical reference balls 20A and 20B and a reference plane 30 including two parallel planes. The reference balls 20A, 20B and the reference plane 30 are securely fixed to the plate 11. Each of the reference balls 20A and 20B is made of material such as ceramic or sintered hard alloy. The reference plane 30 includes an optical parallel plate made of material such as ceramic or glass or a gauge block made of material such as steel or ceramic.

More specifically, the measurement jig 10 includes, for example, an object-holding portion 12, a reference ball mounting portion 13, a reference plane mounting portion 14, and a support shaft 15. The object-holding portion 12 holds the lens 20 around the center of the plate 11 with the front and back surfaces of the lens 20 being exposed. The reference ball mounting portion 13 holds the two reference balls 20A and 20B at a first end of the plate 11 such as by adhesion. Each surface of the balls is exposed on both the front and back surfaces of the plate 11. The reference plane mounting portion 14 holds the reference plane 30 at a second end of the plate 11 opposite the first end across the object-holding portion 12 such as by adhesion. The planes of the reference plane 30 are exposed on both the front and back surfaces of the plate 11, respectively. The support shaft 15 rotatably supports the plate 11 to allow it to rotate in the direction denoted by the arrow R in FIG. 1, thereby inverting the front and back surfaces thereof. The object-holding portion 12 has a not-shown hole thereon to expose the front and back surfaces of the object held by the portion 12.

Figure 2:
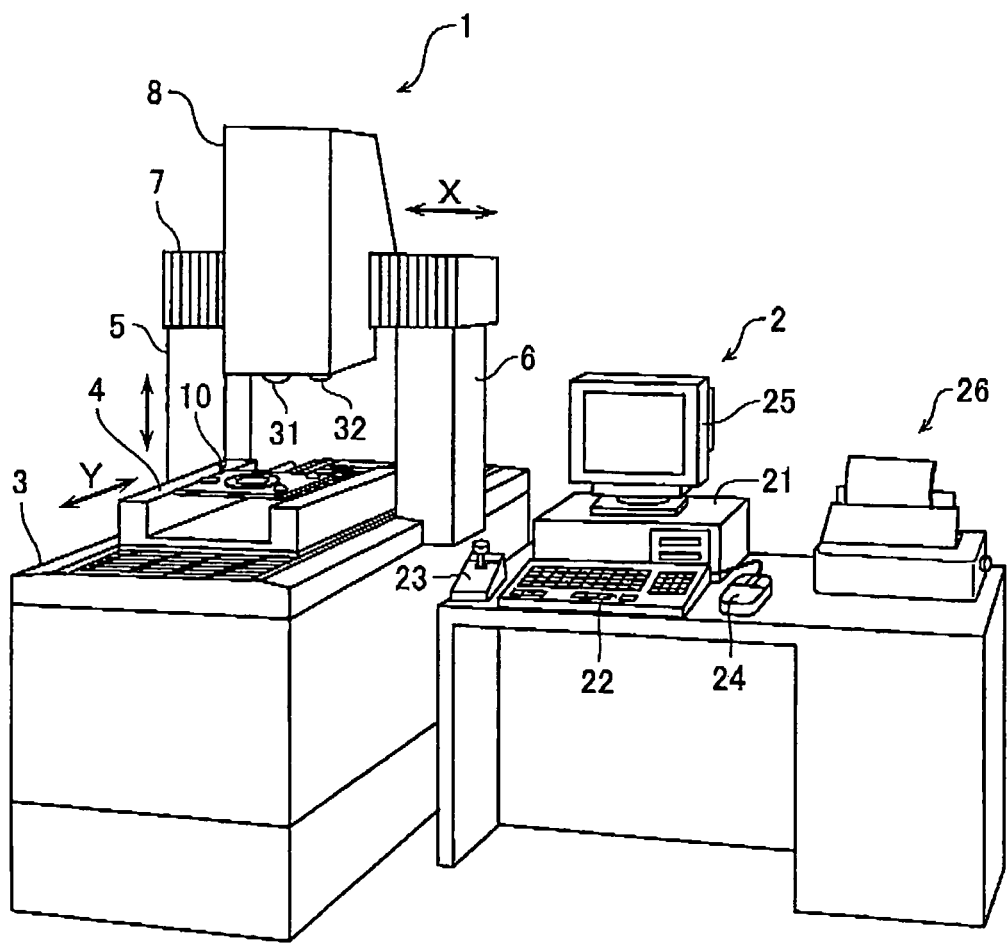
FIG. 2 is a perspective view of an example of the entire three-dimensional shape measurement system including a jig for measuring an object shape according to the first embodiment of the present invention.

FIG. 2 is a perspective view of an example of the entire three-dimensional shape measurement system including the measurement jig 10 configured as above. The three-dimensional shape measurement system includes, for example, a non-contact three-dimensional measurement device 1 and a computer system 2. The computer system 2 may control the operation of the measurement device 1 and perform necessary data processing.

The three-dimensional measurement device 1 may be configured as follows. The device 1 includes a base 3 and a measurement table 4 mounted thereon. The measurement table 4 may rotatably hold the measurement jig 10. The table 4 may be driven in the y-axis direction by a not-shown y-axis drive mechanism. The base 3 includes support arms 5 and 6 extending upward. The arms 5 and 6 are fixed to the base 3 around the centers of the side edges thereof, respectively. An x-axis guide 7 is provided to couple the top ends of the support arms 5 and 6. The x-axis guide 7 supports an imaging unit 8. The imaging unit 8 is driven along the x-axis guide 7 by a not-shown x-axis drive mechanism.

The interior of the imaging unit 8 may be configured as follows. A not-shown slider is provided that may move along the x-axis guide 7. A z-axis guide (not shown) is integrated with the slider. The z-axis guide has a not-shown support plate slidable in the z-axis direction. On the support plate, an imaging means for measuring an image such as a CCD camera 31 and a non-contact displacement meter such as a laser probe 32 are both provided. The CCD camera 31 and the laser probe 32 may thus move together in the three axis directions X, Y, and Z with a certain positional relationship therebetween.

Figure 3:
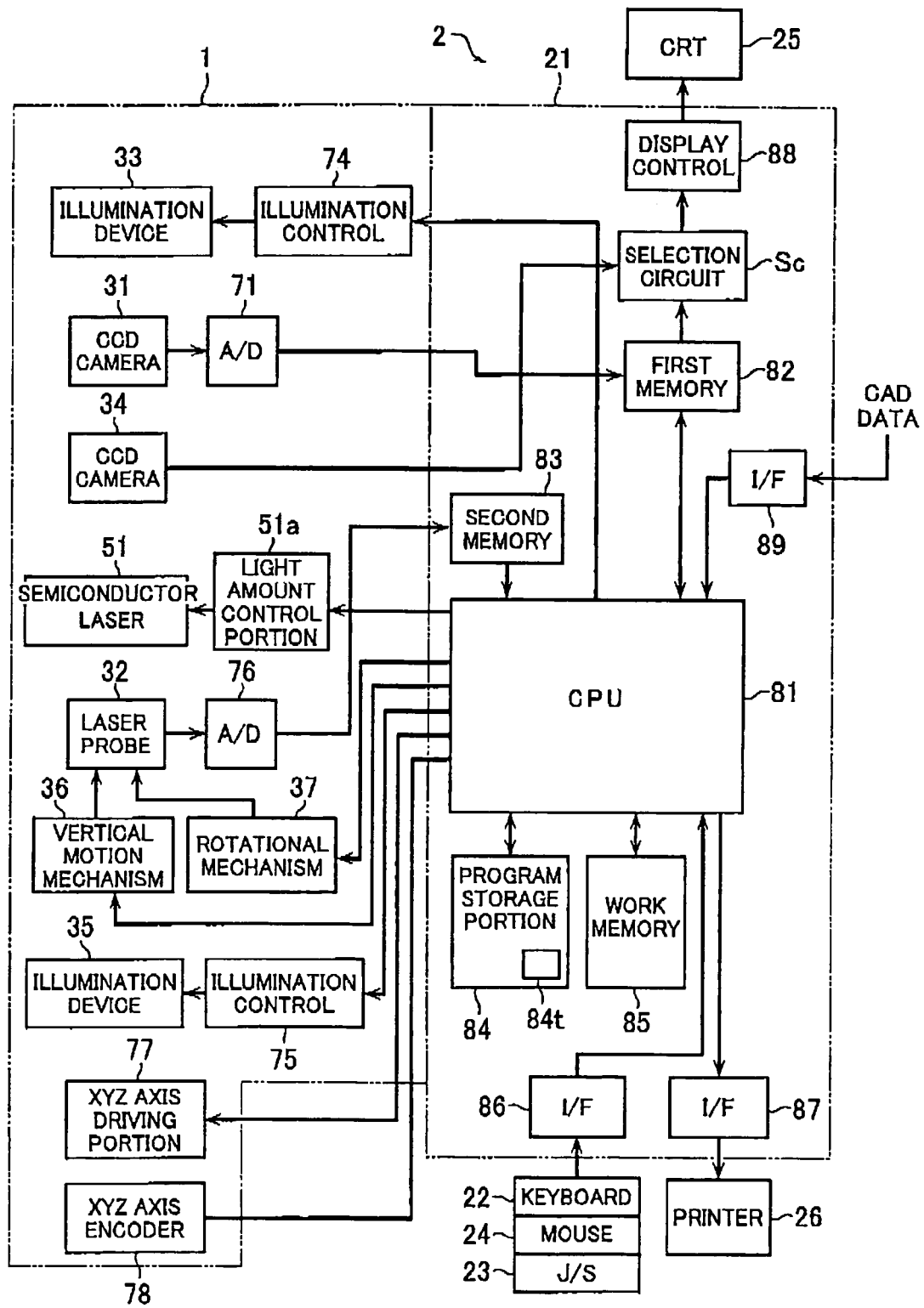
FIG. 3 is a block diagram of an example internal configuration of a computer system.

With reference to FIG. 3, the CCD camera 31 has an illumination device 33 added thereto for illuminating the imaging range. To confirm a position measured by the laser beam from the laser probe 32, a CCD camera 34 and an illumination device 35 are provided in the vicinity of the laser probe 32. The CCD camera 34 images the periphery of the measured position. The illumination device 35 illuminates the measured position by the laser probe 32. The laser probe 32 is supported by a vertical motion mechanism 36 and a rotational mechanism 37. The vertical motion mechanism 36 evacuates the laser probe 32 when the imaging unit 8 moves. The rotational mechanism 37 properly directs the laser beam.

The laser probe 32 includes a semiconductor laser 51 and a light amount control portion 51*a*. The light amount control portion 51*a* controls the amount of light emitted from the semiconductor laser 51. The semiconductor laser 51 emits light. The light passes through a not-shown beam splitter, a ¼-wavelength plate, and an objective lens. The light then forms a light spot in a measurement portion of the measurement jig 10. The measurement jig 10 reflects light. The light passes through the ¼-wavelength plate, reflects from the beam splitter, and passes through a conoscope (not shown). The light then forms interference fringes on a CCD device of the CCD camera.

The conoscope includes a polarizer on the incident side, an analyzer on the emitting side, and a birefringent crystal sandwiched therebetween. Specifically, incident light is polarized by the polarizer. The light is then divided into two wavefronts by the birefringent crystal. The two wavefronts have orthogonal polarization directions. The two polarized light beams have a phase difference therebetween. The two polarized components have a 90 degree phase shift therebetween. The two beams then overlap again through the analyzer, thus forming concentric interference fringes.

The cycle of the generated interference fringes depends on the object height (scatter angle). The frequency of the interference fringes may thus be analyzed to detect the displacement of the object in the optical axis direction. In this way, the output from the laser probe 32 includes height information. The height information may advantageously provide information such as a cross-sectional shape or a surface texture in the scanning plane.

The three-dimensional measurement device 1 includes the CCD camera 31 for measuring an image and the CCD camera 34 for confirming measuring positions by the laser probe 32. The CCD cameras 31 and 34 image the measurement jig 10 to provide image signals. The image signals are supplied to a computer 21. One of the two image signals is selected by a selection circuit Sc as described below. The selected image signal is displayed on a CRT display 25. Illumination light necessary for imaging by the CCD cameras 31 and 34 is provided by illumination devices 33 and 35. The illumination devices 33 and 35 are controlled by illumination control portions 74 and 75, respectively, based on the control by the computer 21.

The displacement amount signal obtained from the laser probe 32 is sent to an A/D converter 76. The signal is temporarily stored in a second memory 83, and then supplied to the computer 21. These components are included in the imaging unit 8. The unit 8 is driven in the XYZ axis directions by an XYZ axis driving portion 77. The portion 77 operates according to the control by the computer 21. The position of the imaging unit 8 in the XYZ axis directions is detected by an XYZ axis encoder 78. The detected position is supplied to the computer 21. The light amount control portion 51*a* controls the amount of laser light emitted from the semiconductor laser 51 in the laser probe 32. The control portion 51*a* performs the control according to a control signal from a CPU 81.

The computer 21 may include the following components: a CPU 81 which works as the main component of the control; a first memory 82 connected to the CPU 81; a second memory 83; a program storage portion 84; a work memory 85; interfaces 86 and 87 and 89; a selection circuit Sc for selecting multi-level image data stored in the first memory 82 or an image signal supplied from the CCD camera 34; and a display control portion 88 for displaying multi-level image data selected by the selection circuit Sc on the CRT display 25.

The CPU 81 switches the selection circuit Sc between an image measurement mode and a laser measurement mode. An image from multi-level image data stored in the first memory 82 or an image from an image signal supplied from the CCD camera 34 is displayed on the CRT display 25 by the display control operation of the display control portion 88.

An instruction information from a keyboard 22, a joystick 23, and a mouse 24 as a result of an operator's instruction is input to the CPU 81 via the interface 86. The CPU 81 captures data such as displacement amount detected by the laser probe 32 and XYZ coordinate information from the XYZ axis encoder 78.

The CPU 81 uses the above input information, the operator's instruction, programs stored in the program storage portion 84, and a table 84*t* to perform various processes. The processes include stage movement by the XYZ axis driving portion 77, analysis of the images of the lens 20 or the like mounted on the measurement jig 10, calculation of the measured values, and the control of the laser light amount from the semiconductor laser 51. The CPU 81 also controls a not-shown rotational mechanism on the measurement table 4 for rotating the measurement jig 10 to rotate the measurement jig 10 around the support shaft 15.

The work memory 85 provides working areas for the various processes of the CPU 81. The measured values are output to the printer 26 via the interface 87. The interface 89 is adapted to convert CAD data of the lens 20 or the like from a not-shown external CAD system or the like into a predetermined format and input the converted data to the computer system 2.

Figure 4B:
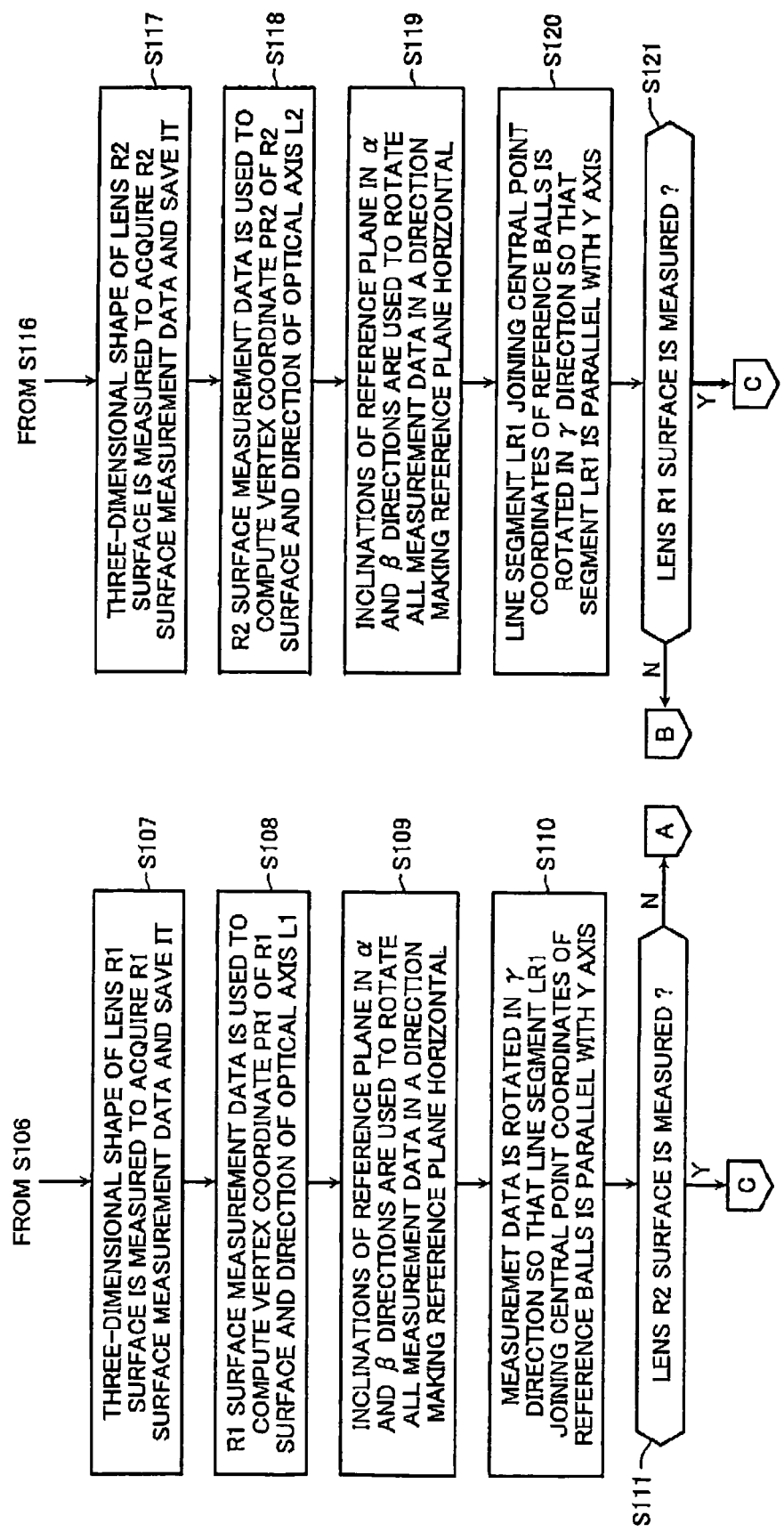
Figure 5:
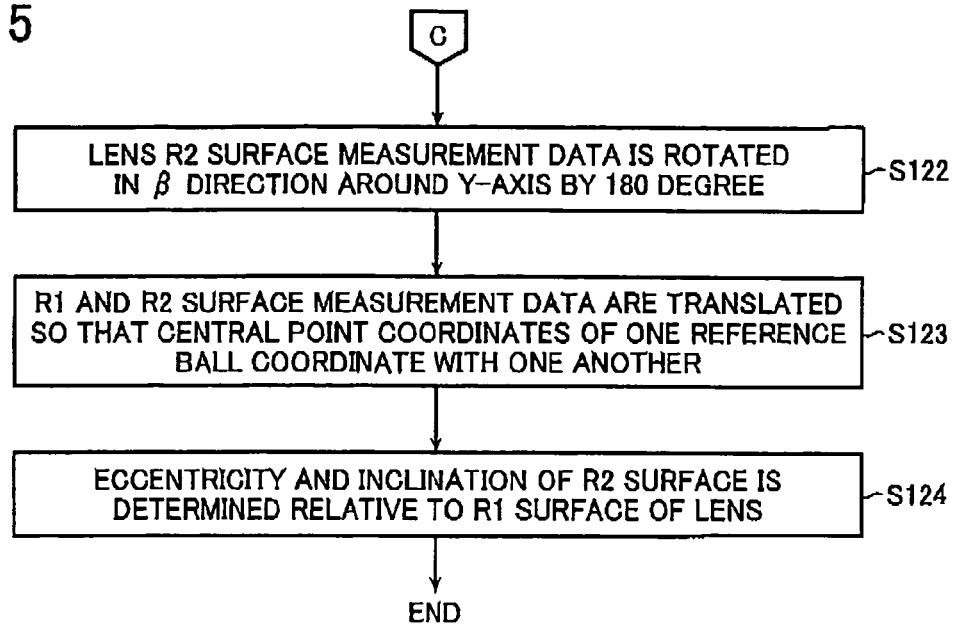
FIG. 5 is a flowchart of an example procedure for measuring the three-dimensional shape of an object using a jig for measuring an object shape according to the first embodiment of the present invention.

FIGS. 4A, 4B, and 5 are flowcharts of an example procedure for measuring the three-dimensional shape of an object using a jig for measuring an object shape according to the first embodiment of the present invention. A description is given of an example where the lens 20 is set on the measurement jig 10, the jig 10 is then attached to the three-dimensional measurement device 1, and the three-dimensional shape of the lens 20 is measured. Note that for the convenience of the description, the concave surface side of the lens 20 is the R1 surface side and the convex surface side is the R2 surface side in this embodiment. With reference to FIG. 4A, the lens 20 is first attached and fixed to the hole of the object-holding portion 12 of the measurement jig 10 (step S100).

It is then determined whether the lens 20 attached to the measurement jig 10 has its RI surface side facing upward (step S101). If so (Y in step S101), control proceeds to step S102. In step S102, the measurement jig 10 is placed on the measurement table 4 of the three-dimensional measurement device 1 with the R1 surface side of the lens 20 facing upward (step S102).

If not (N in step S101), control proceeds to step S112. In step S112, the measurement jig 10 is placed on the measurement table 4 of the three-dimensional measurement device 1 with the R2 surface side of the lens 20 facing upward (step S112). Processes after step S112 will be described later.

When the jig 10 is placed on the measurement table 4 with the RI surface side of the lens 20 facing upward, the three-dimensional shapes are measured for the two reference balls 20A and 20B attached to the reference ball mounting portion 13 of the measurement jig 10. The measurement provides reference ball measurement data, which is three-dimensional shape measurement data of each of the reference balls 20A and 20B. The reference ball measurement data is recorded and saved in the first memory 82 or the like in the computer 21 (step S103).

Figure 6:
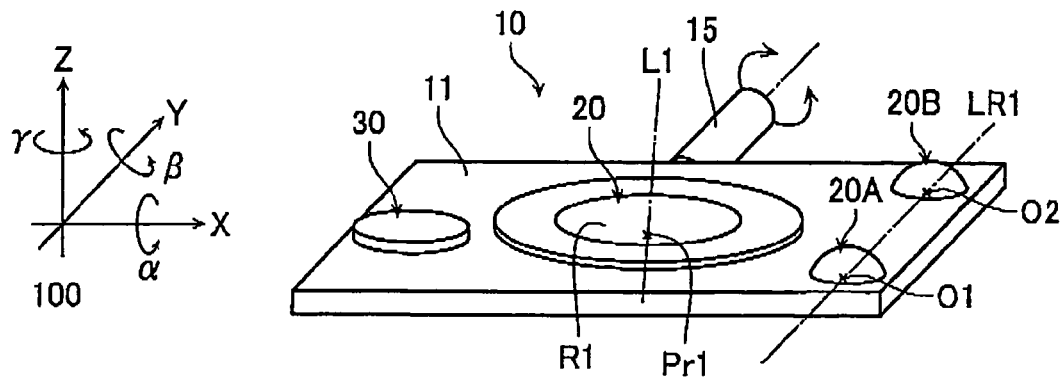
FIG. 6 illustrates measurement on the R1 surface side of the object.

The provided reference ball measurement data is then subject to operation by the CPU 81 of the computer 21. The operation provides computation of the coordinates O1 and O2 of the central points of the respective reference balls 20A and 20B as shown in FIG. 6 (step S104). The computed coordinates of the central points of the reference balls 20A and 20B are then saved in memories such as the first memory 82.

The three-dimensional shape is then measured for the reference plane 30 attached to the reference plane mounting portion 14 of the measurement jig 10. The measurement provides reference plane measurement data, which is a three-dimensional shape measurement data of the reference plane 30. The reference plane measurement data is recorded and saved in memories such as the first memory 82 (step S105).

The provided reference plane measurement data is then subject to operation such as coordinate conversion by the CPU 81. The operation provides computation of an inclination of the reference plane 30 in $\alpha$ direction (shown by an arrow in FIG. 1) around the x-axis of the measurement device coordinate system 100, and an inclination of the reference plane 30 in $\beta$ direction (shown by an arrow in FIG. 1) around the y-axis (step S106). The computed inclination of the reference plane 30 is saved in memories such as the first memory 82.

The three-dimensional shape is then measured for the R1 surface side of the lens 20 fastened to the object-holding portion 12 of the measurement jig 10. The measurement provides R1 surface side measurement data, which is three-dimensional shape measurement data of the R1 surface of the lens 20. The R1 surface side measurement data is saved in memories such as the first memory 82 (step S107 in FIG. 4B).

The R1 surface side measurement data is then subject to operation by the CPU 81. The operation provides computation of the vertex coordinate Pr1 of the R1 surface side of the lens 20 and the direction of the optical axis L1 (step S108). The computed result for the R1 surface side of the lens 20 is saved in memories such as the first memory 82.

The computed inclination of the reference plane 30 (in the $\alpha$ and $\beta$ directions) that is saved in memories such as the first memory 82 in step S106 is subject to coordinate conversion by the CPU 81. The conversion rotates all measurement data (reference ball measurement data, reference plane measurement data, and R1 surface side measurement data) in a direction making the reference plane 30 horizontal (step S109).

After rotating the measurement data, the computed central point coordinates of the reference balls 20A and 20B saved in memories such as the first memory 82 in step S104 are used to allow the CPU 81 to rotate measurement data in the y direction around the z-axis so that a line segment LR1 connecting the central point coordinates O1 and O2 of the reference balls 20A and 20B is parallel with the y-axis of the measurement device coordinate system 100 (step S110). Note that no rotation is done here in other directions than the $\gamma$ direction.

Figure 7:
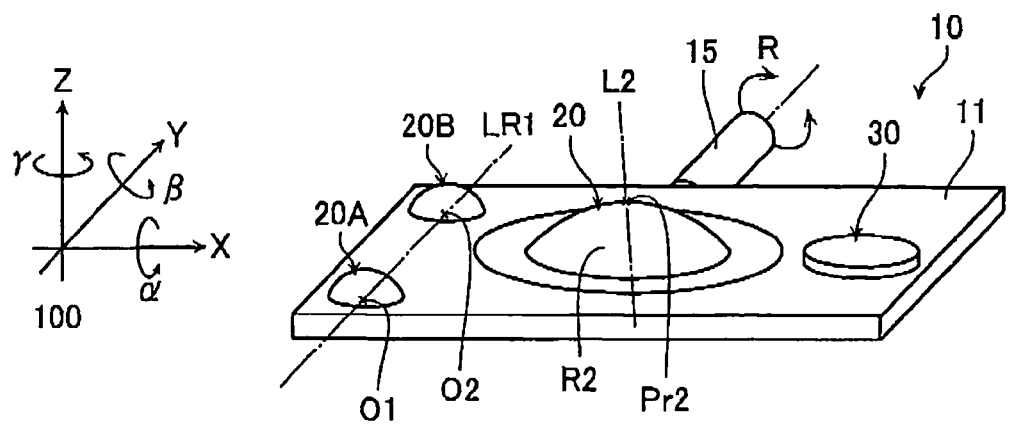
FIG. 7 illustrates measurement on the R2 surface side of the object.

When the above processes are complete, it is then determined whether the three-dimensional shape measurement is complete for the R2 surface side of the lens 20 (step S111). If not (N in step S111), control proceeds to step S112. Steps S113 to S120 are then performed for the R2 surface side of the lens 20 like steps S103 to S110 as shown in FIG. 7. The steps provide measurement data (reference ball measurement data, reference plane measurement data, and R2 surface side measurement data), computed results (the computed central point coordinates of the reference balls 20A and 20B, the computed inclination of the reference plane 30, computed data for the R2 surface side of the lens 20 (the vertex coordinate Pr2 of the R2 surface side and the direction of the optical axis L2)), and the rotation of the measurement data (step S119) and the rotation in the $\gamma$ direction (S120).

When the processes are complete for the R2 surface side of the lens 20, it is then determined whether the three-dimensional shape measurement is complete for the R1 surface side of the lens 20 (step S121). If not (N in step S121), control proceeds to step S102 and the subsequent processes are performed.

If the three-dimensional shape measurement is complete for both the R2 and R1 surface sides of the lens 20 (Y in step S111 or Y in step S121), the CPU 81 is allowed to perform coordinate conversion as shown in FIG. 5. The conversion provides, for example, the rotation of measurement data for the R2 surface side of the lens 20 by 180 degree in the $\beta$ direction around the y-axis of the measurement device coordinate system 100 (step S122).

Figure 8:
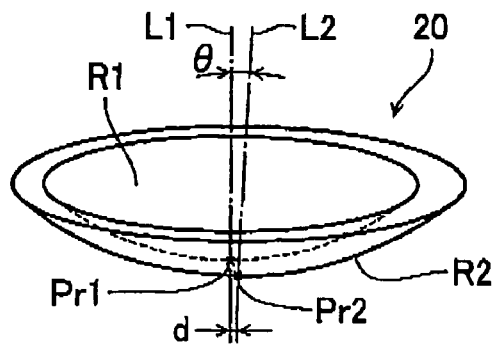
FIG. 8 illustrates an eccentricity and an inclination of the object relative to the RI surface.

Measurement data for the R1 and R2 surface sides of the lens 20 are then translated so that, for example, the central point coordinates O1 of the reference ball 20A coincide with one another (step S123). Eccentricity d and inclination θ of the R2 surface side of the lens 20 is then determined relative to the R1 surface of the lens 20 as shown in FIG. 8 (step S124). A series of three-dimensional shape measurement processes in this flowchart is then finished. Note that although, in step S124, the eccentricity d is determined between the two surfaces of R1 and R2 of the lens 20, the eccentricity d may be determined for the two surfaces, for example, relative to the outer diameter of the lens 20.

Thus, according to the above embodiment, the measurement jig 10 including the two reference balls 20A and 20B and the reference plane 30 is used, and the measurements for the reference balls 20A and 20B and the reference plane 30 may be used to allow the highly accurate and rapid three-dimensional measurement of the front and back (R1 and R2) surfaces of the lens 20.

A set of three-dimensional shape measurement data is acquired by measuring the R1 surface sides of the lens 20, while another set of three-dimensional shape measurement data is acquired by measuring the R2 surface sides of the lens 20 thorough a process different from that of the R1 surface. Then, the two sets of measurement data is subject to alignment using the coordinate conversion of the measurements of the reference balls 20A and 20B and the reference plane 30. The two sets of measurement data after the alignment may be analyzed as three-dimensional shape data that is acquired by measuring the lens 20 in a single process.

Further, the surface on the reference plane 30 may provide more accurate alignment of the front and back surfaces of the lens 20 than when only the reference balls 20A and 20B are used. Moreover, the eccentricity d and the inclination θ of the front and back surfaces thereof may be measured more rapidly.

Note that although one lens 20 is held on the measurement jig 10 in the above measurement processes, when a plurality of lenses are held on the jig 10, each lens may be subject to the above processes, and the reference balls 20A and 20B, the reference plane 30, and the lenses 20 may be measured in any order, and the R1 and R2 surfaces of the lenses 20 may also be measured in any order.

Second Embodiment

With reference to FIGS. 9 to 18, a second embodiment of the present invention will be described below.

Figure 9:
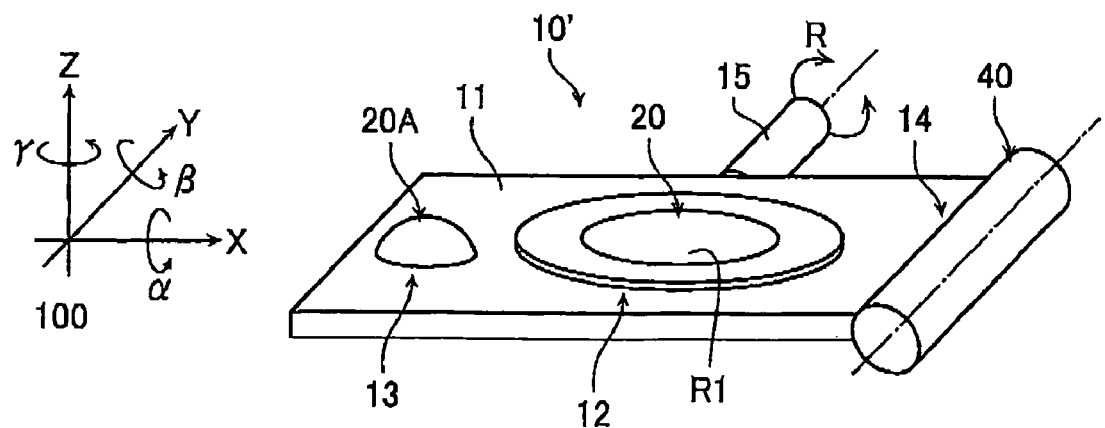
FIG. 9 is a perspective view of the entire configuration of a jig for measuring an object shape according to a second embodiment of the present invention.

FIG. 9 is a perspective view of the entire configuration of a jig 10' for measuring an object shape according to the second embodiment of the present invention. Note that in the following embodiment, an object includes, for example, a lens 20 manufactured by resin mold, and an eccentricity and an inclination between the lens front and back surfaces are determined by application of a method for measuring a three-dimensional shape according to the present invention. In FIG. 9, like elements as those in the first embodiment are designated by like reference numerals as those in FIG. 1, and their detailed description may be omitted below. The second embodiment may include the three-dimensional shape measurement system 1 configured in a similar way to that in FIGS. 2 and 3.

With reference to FIG. 9, the measurement jig 10' includes the plate 11 and the object-holding portion 12 like the measurement jig 10 in the first embodiment. An object such as the lens 20 may be held in a similar way to the first embodiment.

The measurement jig 10' includes one reference ball 20A similar to the ball 20A in the first embodiment and a reference cylinder 40 made of material such as ceramic, glass, or steel. The ball 20A is fixed to the plate 11. The cylinder 40 is also fixed to the plate 11 and is held on the side thereof. In this embodiment, the reference plane 30 (FIG. 1) is replaced with the reference cylinder 40. Although the first embodiment includes two reference balls 20A and 20B, the second embodiment includes only one reference ball 20A.

The measurement jig 10' includes a reference cylinder attachment portion 14.

The reference ball mounting portion 13 is provided at a first end of the plate 11. The reference cylinder attachment portion 14 includes the reference cylinder 40 on the end surface at a second end opposite the first end across the object-holding portion 12. The reference cylinder 40 is attached to the end surface such as by adhesion with its outer surface being exposed on both the front and back surfaces of the plate 11. The support shaft 15 rotatably supports the plate 11 to rotate it in the direction denoted by the arrow R in FIG. 9 to invert the front and back surfaces thereof.

Figure 11:
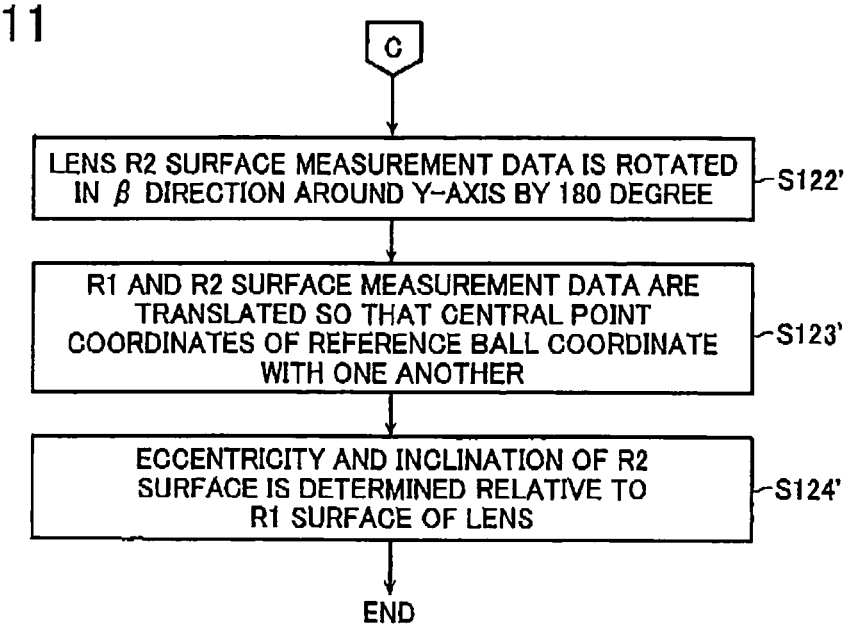
FIG. 11 is a flowchart of an example procedure for measuring the three-dimensional shape of an object using a jig for measuring an object shape according to the second embodiment of the present invention.

FIGS. 10A, 10B, and 11 are flowcharts of an example procedure for measuring the three-dimensional shape of an object using a jig for measuring an object shape according to the second embodiment of the present invention. A description is given of an example where the lens 20 is set on the measurement jig 10', the jig 10' is then attached to the three-dimensional measurement device 1, and the three-dimensional shape of the lens 20 is measured. Note that for the convenience of the description, the concave surface side of the lens 20 is the R1 surface side and the convex surface side is the R2 surface side in this embodiment.

With reference to FIG. 10A, steps S100' to S101' similar to steps S100 to S101 in FIG. 4A are performed.

When the lens 20 is placed on the jig 10', with its R1 surface side facing upward, the three-dimensional shape is then measured for the reference ball 20A attached to the reference ball mounting portion 13 of the measurement jig 10'. The measurement provides reference ball measurement data, which is three-dimensional shape measurement data of the reference ball 20A. The reference ball measurement data is recorded and saved in memories such as the first memory 82 in the computer 21 (step S103').

Figure 12:
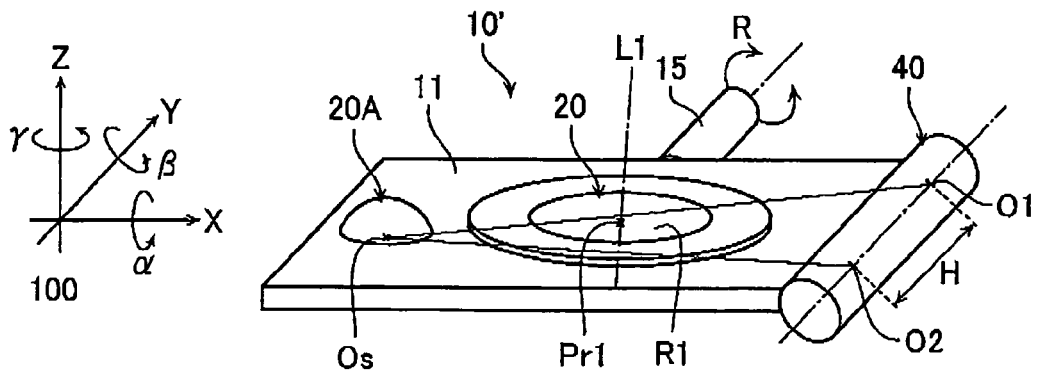
FIG. 12 illustrates measurement on the R1 surface side of the object.

The provided reference ball measurement data is then subject to operation by the CPU 81 in the computer 21. The operation provides computation of the coordinate Os of the central point of the reference ball 20A as shown in FIG. 12 (step S104'). The computed coordinate of the central point of the reference ball 20A is then saved in memories such as the first memory 82.

As described above, the reference cylinder 40 is attached to the reference cylinder attachment portion 14 of the measurement jig 10'. The two-dimensional shape of a cross-section of the reference cylinder 40 is measured at two points separated by a predetermined distance H along the cylinder 40. The measurement provides reference cylinder measurement data, which is two-dimensional shape measurement data of the reference cylinder 40. The reference cylinder measurement data is recorded and saved in memories such as the first memory 82 (step S105'). The provided reference cylinder measurement data is used to allow the CPU 81 to compute the central point coordinates O1 and O2 of the respective cross-sectional circles (step S106'). The computed central point coordinates of the reference cylinder 40 are saved in memories such as the first memory 82.

The three-dimensional shape is then measured for the R1 surface side of the lens 20 fastened to the object-holding portion 12 of the measurement jig 10. The measurement provides R1 surface side measurement data, which is three-dimensional shape measurement data of the R1 surface of the lens 20. The R1 surface side measurement data is saved in memories such as the first memory 82 (step S107' in FIG. 10B).

The R1 surface side measurement data is then subject to operation by the CPU 81. The operation provides computation of the vertex coordinate Pr1 of the R1 surface side and the direction of the optical axis L1 of the lens 20 (step S108). Computed data for the R1 surface side of the lens 20 is saved in memories such as the first memory 82.

Figure 13A:
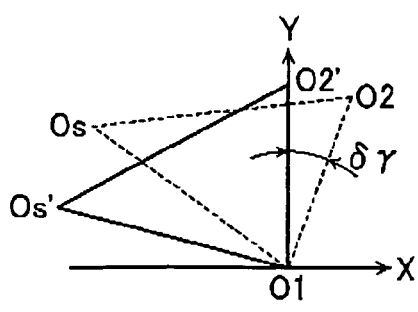
FIGS. 13A and 13B illustrate a rotation process in the procedure for measuring a three-dimensional shape.
Figure 13B:
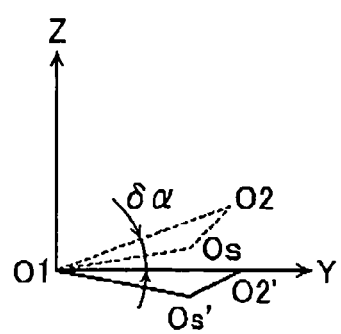

Thus, the measurement data of the central point coordinate Os of the reference ball 20A, the central point coordinates O1 and O2 of the circles, and the vertex coordinate Pr1 of the R1 surface side and the direction of the optical axis L1 of the lens 20 are computed in steps S104', S106', and S108', respectively. The computed data is then subject to coordinate conversion by the CPU 81. The conversion rotates the measurement data in the a direction around the x-axis by δγ as shown in FIG. 13A and in the y direction around the z-axis by δα as shown in FIG. 13B (step S109') so that the line segment O1-O2 connecting the central point coordinates O1 and O2 of the circles obtained in step S106' coincides with the y-axis of the measurement device coordinate system 100 (i.e., the line segment O1-O2 coincides with the line segment O1-O2' and the central point coordinate Os of the reference ball 20A coincides with the central point coordinate Os' of the reference ball 20).

Figure 14:
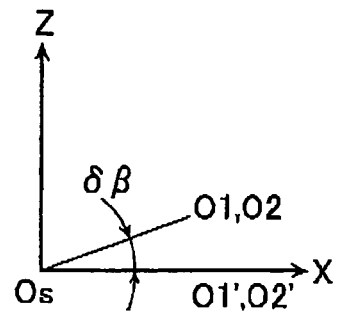
FIG. 14 illustrates a rotation process in the procedure for measuring a three-dimensional shape.

The measurement data of the central point coordinate Os of the reference ball 20A, the central point coordinates O1 and O2 of the circles, the vertex coordinate Pr1 of the R1 surface side and the direction of the optical axis L1 of the lens 20, which are computed in steps S104', S106', and S108', respectively, is also subject to another coordinate conversion by the CPU 81. The conversion rotates the measurement data in the β direction around the y-axis by δβ as shown in FIG. 14 so that the plane Os-O1-O2 connecting the central point coordinate Os obtained in step S104' and the central point coordinates O1 and O2 obtained in step S106' is parallel with the x-y plane (i.e., the plane Os-O1-O2 coincides with the plane Os-O1'-O2')(step S110').

Figure 15:
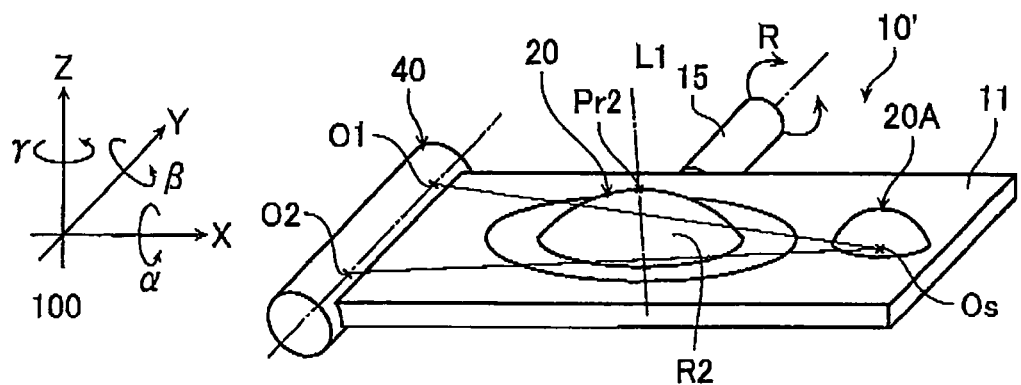
FIG. 15 illustrates measurement on the R2 surface side of the object.

When the above processes are complete, it is then determined whether the three-dimensional shape measurement is complete for the R2 surface side of the lens 20 (step S111'). If not (N in step S111'), control proceeds to step S112'. Steps S113' to S120' are then performed for the R2 surface side of the lens 20 like steps S103' to S110' as shown in FIG. 15. The steps provide the following: each measurement data (reference ball measurement data, reference cylinder measurement data, and R2 surface side measurement data); each computed result (the computed central point coordinate of the reference ball 20A, each computed central point coordinate of the reference cylinder 40, and computed data for the R2 surface side of the lens 20 (the vertex coordinate Pr2 of the R2 surface side and the direction of the optical axis L2)); and the measurement data rotation (steps S119' and S120').

When the processes are complete for the R2 surface side of the lens 20, it is then determined whether the three-dimensional shape measurement is complete for the R1 surface side of the lens 20 (step S121). If not (N in step S121), control proceeds to step S102 and the subsequent processes are performed.

Figure 16:
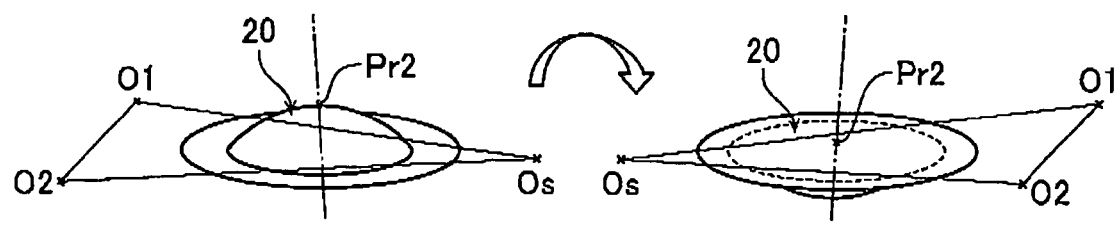
FIG. 16 illustrates a rotation process of the R2 surface side measurement data in the procedure for measuring a three-dimensional shape.

If the three-dimensional shape measurement is complete for both the R2 and R1 surface sides of the lens 20 (Y in step S111' and Y in step S121'), the measurement data is then subject to coordinate conversion by the processing portion as shown in FIG. 11. The conversion provides, for example, the rotation of measurement data for the R2 surface side of the lens 20 by 180 degree in the β direction around the y-axis of the measurement device coordinate system 100 as shown in FIG. 16 (step S122').

Figure 17:
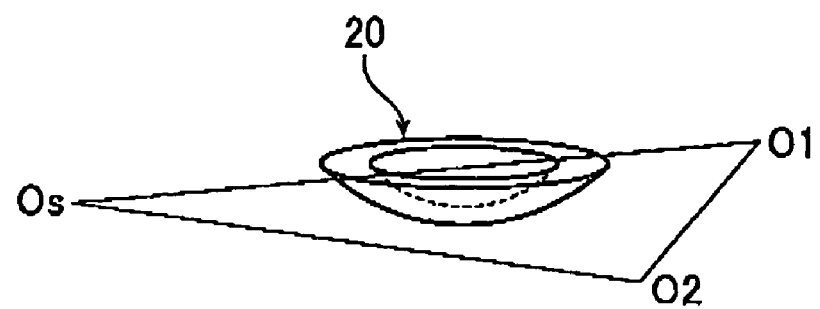
FIG. 17 illustrates a translation process of the R1 and R2 surface sides measurement data in the procedure for measuring a three-dimensional shape.
Figure 18:
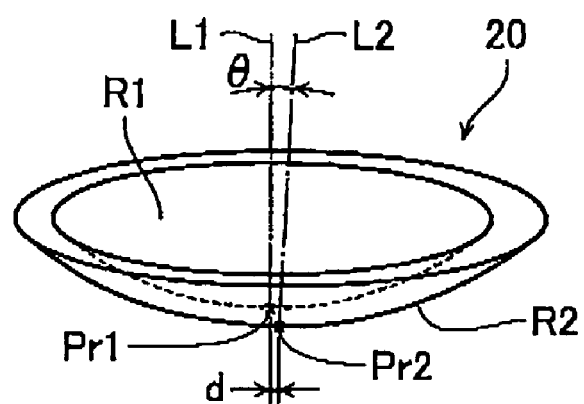
FIG. 18 illustrates an eccentricity and an inclination of the object relative to the R1 surface side.

Measurement data for the R1 and R2 surface sides of the lens 20 are then translated so that, for example, the central point coordinate Os of the reference ball 20A on both surface sides coincide with one another as shown in FIG. 17 (step S123'). An eccentricity d and an inclination θ of the R2 surface side of the lens 20 is then determined relative to the R1 surface of the lens 20 as shown in FIG. 18 (step S124'). A series of three-dimensional shape measurement processes in this flowchart is then ended. Note that although, in step S124', the eccentricity d is determined between the two surfaces of R1 and R2 of the lens 20, the eccentricity d may be determined for the two surfaces, for example, relative to the outer diameter of the lens 20.

Thus, according to the above embodiment, the measurement jig 10' including the reference ball 20A and the reference plane 30 is used, and each measurement for the reference ball 20A and the reference plane 30 may be used to allow for the highly accurate and rapid three-dimensional measurement of the front and back surfaces (R1 and R2 surfaces) of the lens 20.

A set of three-dimensional shape measurement data is acquired by measuring the R1 surface sides of the lens 20, while another set of three-dimensional shape measurement data is acquired by measuring the R2 surface sides of the lens 20 thorough a process different from that of the R1 surface. Then, the two sets of measurement data is subject to alignment using the coordinate conversion of the measurements of the reference balls 20A and the reference cylinder 40. The two sets of measurement data after the alignment may be analyzed as three-dimensional shape data that is acquired by measuring the lens 20 in a single process.

Further, the plane Os-O1-O2 obtained by the reference ball 20A and the reference cylinder 40 may provide more accurate alignment of the front and back surfaces of the lens 20 than when only the reference ball 20A is used. Moreover, the eccentricity d and the inclination θ of the front and back surfaces thereof may be measured more rapidly.

Note that although, in the above measurement processes, one lens 20 is held on the measurement jig 10', a plurality of lenses may be held on the jig 10'. Each lens may be subject to the above processes. The measurements of the reference ball 20A, the reference cylinder 40, and the lenses 20 may be performed in any order, and the measurements of the R1 and R2 surfaces of each lens 20 may also be performed in any order.

Thus, although the invention has been described with respect to particular embodiments thereof, it is not limited to those embodiments. Various additions, modifications, substitutions, additions, deletions and the like may be made without departing from the spirit of the present invention. For example, the method for measuring a three-dimensional shape described in the above embodiments may be implemented by a program in which the method is incorporated in advance and that is run in the three-dimensional measurement device 1 as well as in a surface texture measurement system including an outline shape measurement device or the like. The program may be recorded in storage-medium readable by the computer 21 such as a hard disk, a flexible disk, a CD-ROM, an MO, a DVD, or a Blu-ray Disc, and may be run by the computer reading the program from the storage medium. The program may be transmission media that may be distributed over a network such as the Internet.

What is claimed is:

1. A jig for measuring an object shape, comprising:
    a plate having a first surface and a second surface opposed to the first surface;
    two reference balls fixed to the plate, each ball surface being exposed on both the first and second surfaces;
    a reference plane fixed to the plate, the reference plane having a first plane and a second plane that are parallel to each other, the first and second planes being exposed on the first and second surfaces of the plate, respectively; and
    an object-holding portion fixed to the plate, the object-holding portion having a hole passing through the plate, the object-holding portion being able to hold an object in the hole with the front and back surfaces of the object being exposed on the first and second surfaces of the plate, respectively.

2. The jig for measuring an object shape according to claim 1, further comprising a support shaft for rotatably supporting the plate to invert the first and second surfaces thereof.

3. A method for measuring a three-dimensional shape, comprising the steps of:
    providing a jig for measuring an object shape, the jig comprising a plate having a first surface and a second surface opposed to the first plate, two reference balls fixed to the plate, and a reference plane having two parallel planes and fixed to the plate, and holding the reference balls, the reference plane, and at least one object on the plate with their surfaces being exposed on both the first and second surfaces of the plate;

performing a three-dimensional measurement for each of the front and back surfaces of the object, the three-dimensional measurement comprising measuring the three-dimensional shape of each of the two reference balls to compute the central point coordinate of each reference ball, measuring the three-dimensional shape of the reference plane to compute inclinations of the reference plane around the x-axis and around the y-axis, measuring the three-dimensional shape of a surface of the object to obtain measurement data, performing coordinate conversion of the central point coordinates, the inclinations, and the measurement data, using the measured three-dimensional shape of the reference plane, to make the reference plane horizontal, and performing coordinate conversion of the central point coordinates, the inclinations, and the measurement data around the z-axis orthogonal to the x- and y-axes so that a line connecting the central point coordinates of the two reference balls is parallel with the y-axis; and using the measurement data obtained for the front and back surfaces of the object to compute relative position data between the front and back surfaces.

4. A jig for measuring an object shape, comprising;

a plate having a first surface and a second surface opposed to the first plate;

a reference ball fixed to the plate, the ball surface being exposed on both the first and second surfaces;

a reference cylinder fixed to a side of the plate with its circumferential surface being exposed on both the first and second surfaces of the plate; and an object-holding portion fixed to the plate, the object-holding portion having a hole passing through the plate, the object-holding portion being able to hold an object in the hole with the front and back surfaces of the object being exposed on the first and second surfaces of the plate, respectively.

5. The jig for measuring an object shape according to claim 4, further comprising a support shaft for rotatably supporting the plate to invert the first and second surfaces thereof.

6. A method for measuring a three-dimensional shape, comprising the steps of:

providing a jig for measuring an object shape, the jig comprising a plate having a first surface and a second surface opposed to the first plate, a reference ball fixed to the plate, and a reference cylinder fixed to the plate, and holding the reference ball, the reference cylinder, and at least one object on the plate with their surfaces being exposed on both the first and second surfaces of the plate;

performing a three-dimensional measurement for each of a front surface and back surfaces of the object, the three-dimensional measurement comprising measuring the three-dimensional shape of the reference ball to compute the central point coordinate of the reference ball, measuring the two-dimensional shape of each cross section of the reference cylinder at two points separated by a predetermined distance in the axis direction to compute the central point coordinate of each cross-sectional circle, measuring the three-dimensional shape of the surface of the object to obtain measurement data, performing coordinate conversion of the central point coordinates and the measurement data around the x-axis and around the z-axis, using the measurements of the reference ball, the reference cylinder, and the object, so that a line segment connecting each central point coordinate of the circles coincides with the y-axis, and performing coordinate conversion of the central point coordinates and the measurement data around the y-axis, using the measurements of the reference ball, the reference cylinder, and the object, so that a plane connecting the central point coordinates of the reference ball and the circles is parallel with the x-y plane; and using the measurement data obtained for the front and back surfaces of the object to compute relative position data between the front and back surfaces.

* * * * *